(12) United States Patent
Wang et al.

(10) Patent No.: US 7,164,578 B2
(45) Date of Patent: Jan. 16, 2007

(54) COMMON LOCK FOR DUAL-USAGE PORTABLE COMPUTER

(75) Inventors: Wen-Chieh Wang, Taipei (TW); Chin-Ming Chang, Taipei (TW); Chin-Ku Chuang, Taipei (TW)

(73) Assignee: Tatung Co., Ltd., Taipei (TW)

( * ) Notice: Subject to any disclaimer, the term of this patent is extended or adjusted under 35 U.S.C. 154(b) by 54 days.

(21) Appl. No.: 11/145,230

(22) Filed: Jun. 6, 2005

(65) Prior Publication Data

US 2006/0138784 A1 Jun. 29, 2006

(30) Foreign Application Priority Data

Dec. 27, 2004 (TW) ............................... 93140779 A

(51) Int. Cl.
*G06F 1/16* (2006.01)
(52) U.S. Cl. .................. 361/683; 292/24; 292/102; 312/223.1; D14/315
(58) Field of Classification Search ................ 361/683, 361/681, 680; 292/24, 102; 312/223.1, 312/223.2; D14/315
See application file for complete search history.

(56) References Cited

U.S. PATENT DOCUMENTS 5,465,191 A * 11/1995 Nomura et al. ............. 361/681
6,115,239 A * 9/2000 Kim ........................... 361/681
6,122,152 A * 9/2000 Goto et al. .................. 361/681
6,125,040 A * 9/2000 Nobuchi et al. ........... 312/223.1
6,535,380 B1 * 3/2003 Lee et al. .................... 361/683
6,707,665 B1 * 3/2004 Hsu et al. .................... 361/681
6,776,441 B1 * 8/2004 Liu ............................. 292/24
6,847,520 B1 * 1/2005 Hashimoto ................. 361/680
2002/0047278 A1 * 4/2002 Pauser ......................... 292/48
2006/0076783 A1 * 4/2006 Tsai ............................ 292/24
2006/0146489 A1 * 7/2006 Huang et al. ............... 361/683

FOREIGN PATENT DOCUMENTS

GB 2421542 A * 6/2006

* cited by examiner

*Primary Examiner*—Lisa Lea-Edmonds
(74) *Attorney, Agent, or Firm*—Lowe Hauptman & Berner, LLP

(57) ABSTRACT

A common lock used in a dual-usage portable computer formed of a base member and a display is disclosed to include a left-side hook and a right-side hook respectively pivoted to the base member on the inside, and an elongated operating frame bar axially slidably mounted inside the base member of the portable computer and coupled between the left-side hook and the right-side hook for operation by the user to bias the left-side hook and the right-side hook by means of a lever action and to further force the left-side hook and the right-side hook out of a respective through hole at the base member into engagement with a respective retaining block at the display to lock the display to the base member.

8 Claims, 5 Drawing Sheets

COMMON LOCK FOR DUAL-USAGE PORTABLE COMPUTER

RELATED APPLICATIONS

The present application is based on, and claims priority from, Taiwanese Application No. 093140779, filed Dec. 27, 2004, the disclosure of which is hereby incorporated by reference herein in its entirety.

BACKGROUND OF THE INVENTION

1. Field of the Invention

The present invention relates to a lock and more particularly, to a common lock for use in a dual-usage portable computer.

2. Description of Related Art

A conventional dual-usage portable computer generally comprises a base member and a display. The base member has a keyboard assembly set at the top side thereof. The display is pivotally connected to the base member and rotated relative to the base member between a first position where the screen of the display faces to the base member and the portable computer is used as a notebook computer, and a second position where the screen of the display is set at the opposite side relative to the base member and the portable computer is used as a tablet PC.

FIG. 1 shows a conventional dual-usage computer. As illustrated, the dual-usage portable computer 9 comprises a base member 91, and a display 92. The display 92 is pivotally connected to the base member 91 and rotated relative to the base member 91 for enabling the portable computer 9 to be used as a notebook computer or tablet PC. This dual-usage portable computer further comprises lock means for locking the display 92 to the base member 91 when closed. This lock means comprises a hook 93 perpendicularly extending from the front side of the display 92 on the middle right above the screen 921, and a lock hole 94 disposed at the top side of the base member 91 corresponding to the hook 93. When closing the display 92 on the base member 91, the hook 93 is forced into the lock hole 94 to lock the display 92 to the base member 91. This lock means is functional. However, when the portable computer is set for use as a tablet PC, the hook 93 is exposed to the outside. At this time, the lock means cannot be used to lock the display 92 to the base member 91, and the display 92 may be displaced accidentally relative to the base member 91.

SUMMARY OF THE INVENTION

The present invention has been accomplished under the circumstances in view. It is therefore the main object of the present invention to provide a common lock, which is practical for use in a dual-usage portable computer for locking the portable computer in the form of a notebook computer or tablet PC. According to the present invention, the common lock is used in a dual-usage portable computer comprised of a base member and a display pivotally connected to the base member and rotated relative to the base member. The display comprises a front edge, a left-side retaining block protruded from the front edge at a left side, and a right-side retaining block protruded from the front edge at a right side. The base member comprises a front panel and a top surface. The top surface of the base member has a left-side through hole and a right-side through hole respectively corresponding to the left-side retaining block and right-side retaining block of the display. The front panel has a transverse slot disposed between the left-side through hole and the right-side through hole.

The common lock is comprised of an elongated operating frame bar, a left-side hook, and a right-side hook. The elongated operating frame bar is axially slidably mounted inside the base member, having a middle part, a left end, a right end, and an operating portion protruded from the middle part and inserted through the transverse slot of the front panel of the base member.

The left-side hook is provided inside the base member, having a lower part pivoted to the base member, a middle part pivoted to the left end of the elongated operating frame bar, and an upper part curved upwards and terminating in a hooked portion for insertion through the left-side through hole of the base member to engage the left-side retaining block of the display.

The right-side hook is provided inside the base member, having a middle part pivoted to the base member, a lower part pivoted to the right end of the elongated operating frame bar, and an upper part curved upwards and terminating in a hooked portion for insertion through the right-side through hole of the base member to engage the right-side retaining block of the display.

Therefore, either the portable computer is set in the form of a notebook computer or tablet PC, the user can operate the elongated operating frame bar to bias the left-side hook and the right-side hook, forcing the upwardly curved hooked portions of the hooks out of the left-side through hole and right-side through hole of the base member respectively into engagement with the left-side retaining block and right-side retaining block of the display, thereby locking the display to the base member.

The operating portion comprises a shank perpendicularly extending from the middle part of the elongated operating frame bar and inserted through the transverse slot of the base member, and an anti-slip finger block fixedly connected to the front end of the shank and disposed outside the base member.

Further, the left-side retaining block defines a retaining hole for receiving the hooked portion of the left-side hook, and the right-side retaining block defines a retaining hole for receiving the hooked portion of the right-side hook.

The base member can be formed of a top cover shell and a bottom cover shell. In this case, the left-side through hole and right-side through hole of the base member are cut through the top cover shell. Further, the top surface of the base member is mounted with a keyboard.

DETAILED DESCRIPTION OF THE PREFERRED EMBODIMENT

Figure 1:
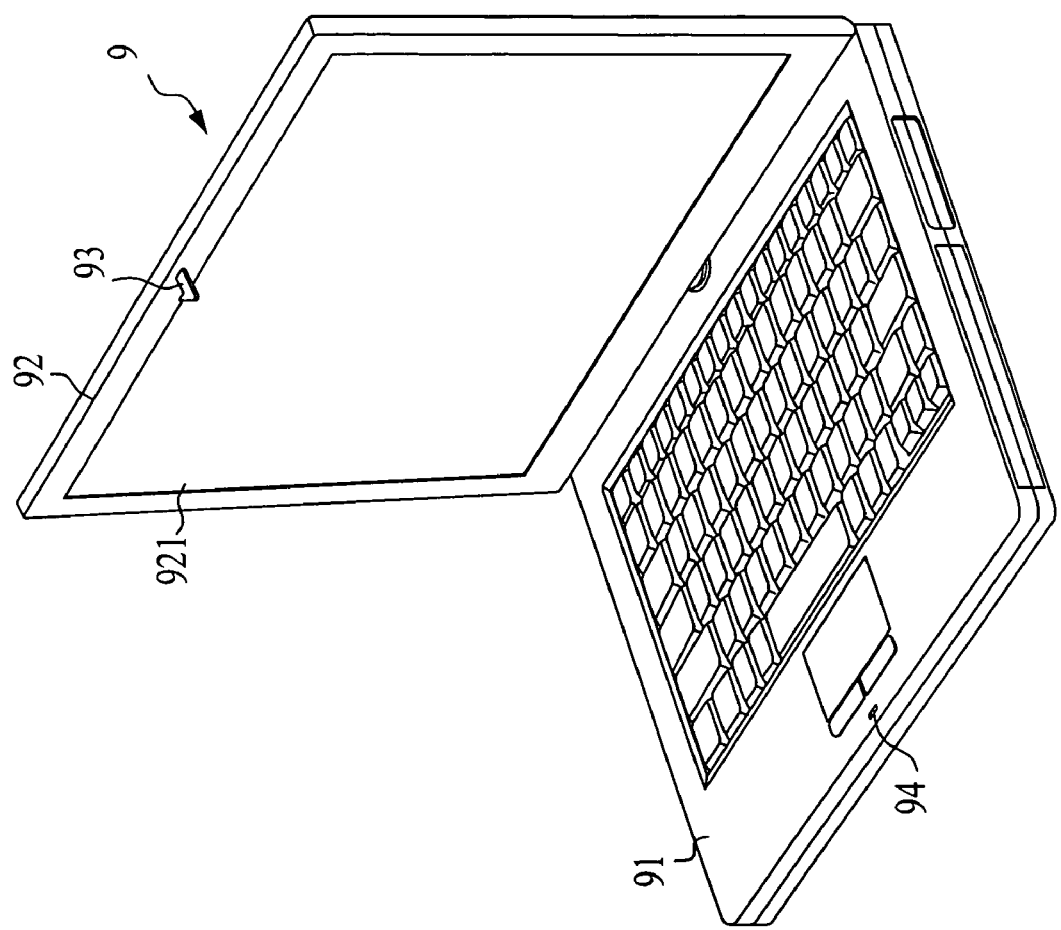
FIG. 1 is an elevational view of a dual-usage portable computer according to the prior art.
Figure 2:
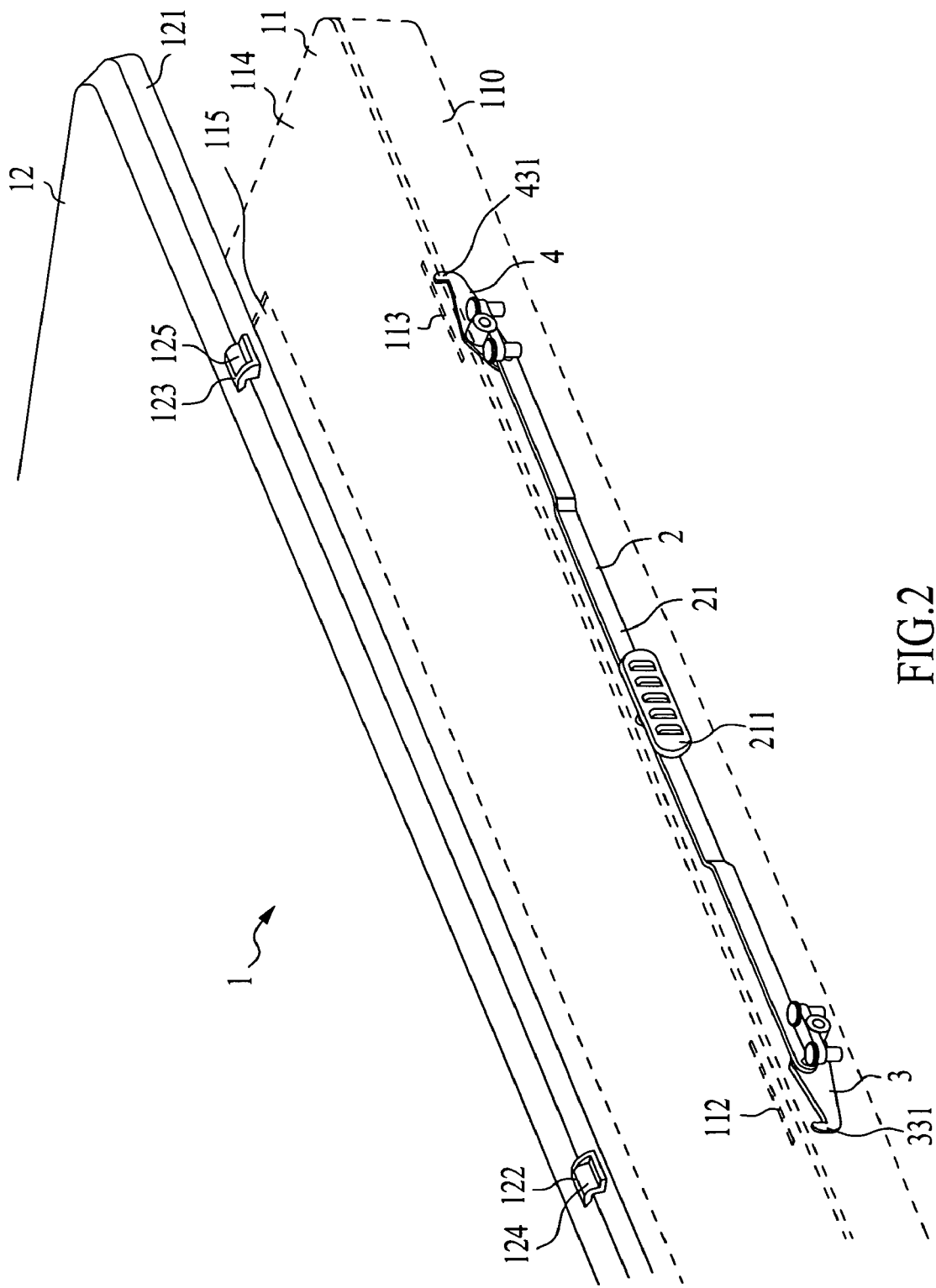
FIG. 2 illustrates a dual-usage portable computer embodying the present invention.

Referring to FIG. 2, a dual-usage portable computer 1 in accordance with the present invention is shown comprised of a base member 11 and a display 12. The display 12 is pivotally connected to the base member 11 and rotated relative to the base member 11.

Figure 3:
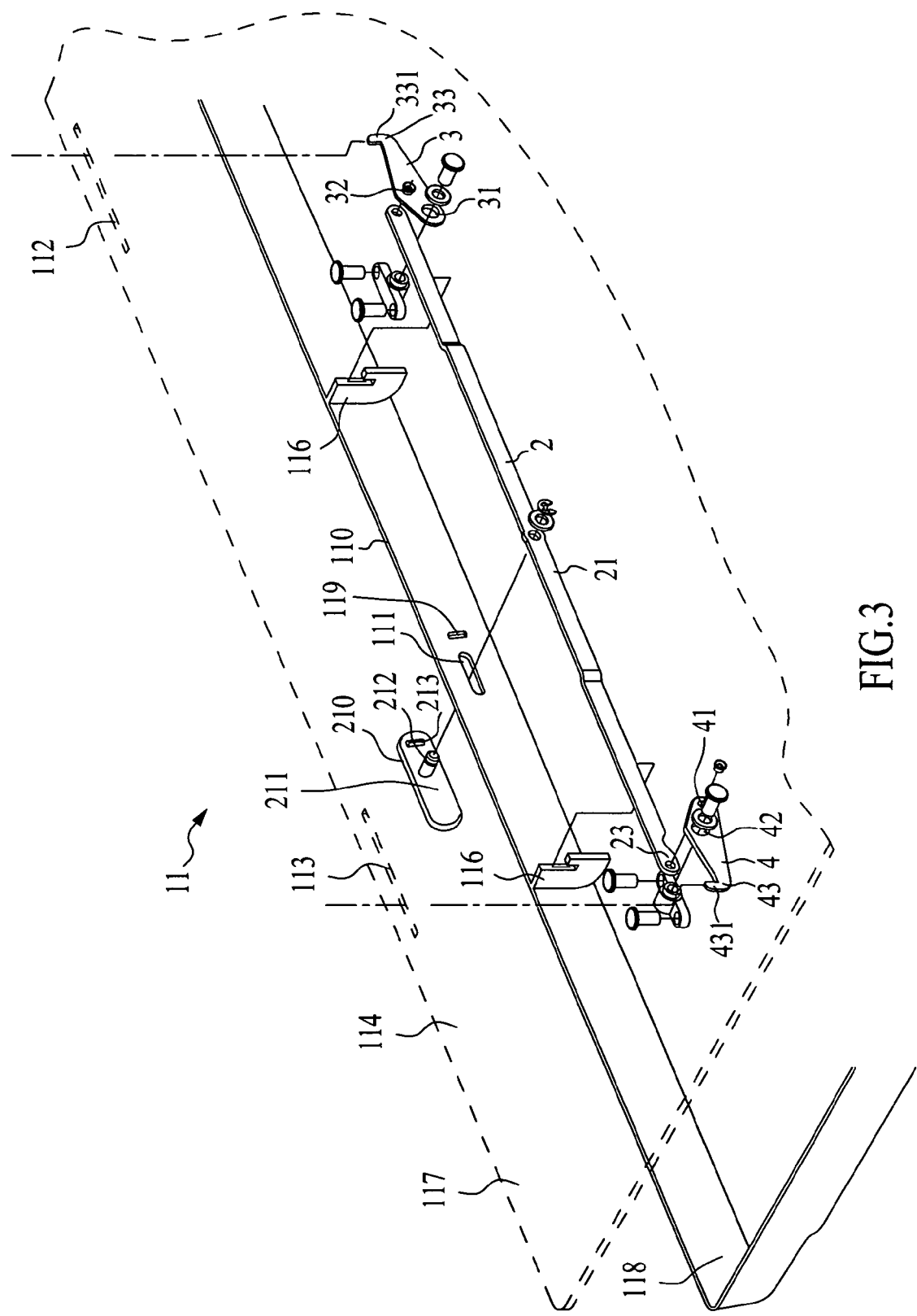
FIG. 3 is an exploded view of the preferred embodiment of the present invention.

Referring to FIG. 3 and FIG. 2 again, the display 12 comprises a front edge 121, a left-side retaining block 122 protruded from the front edge 121 near the left side, and a right-side retaining block 123 protruded from the front edge 121 near the right side. The left-side retaining block 122 defines a retaining hole 124. The right-side retaining block 123 defines a retaining hole 125.

The aforesaid base member 11 is formed of a top cover shell 117 and a bottom cover shell 118. The bottom cover shell 118 has a front panel 110. The top cover shell 117 has a left-side through hole 112 and a right-side through hole 113 cut through the top and bottom surfaces thereof, and a keyboard 115 mounted in a top surface 114 of the top cover shell 117. The left-side through hole 112 and the right-side through hole 113 are set corresponding to the left-side retaining block 122 and right-side retaining block 123 of the display 12 respectively.

The front panel 110 of the bottom cover shell 118 has an elongated transverse slot 111, which is disposed between the left-side through hole 112 and the right-side through hole 113, and sliding track members 116 protruded from the inside wall thereof.

Figure 4:
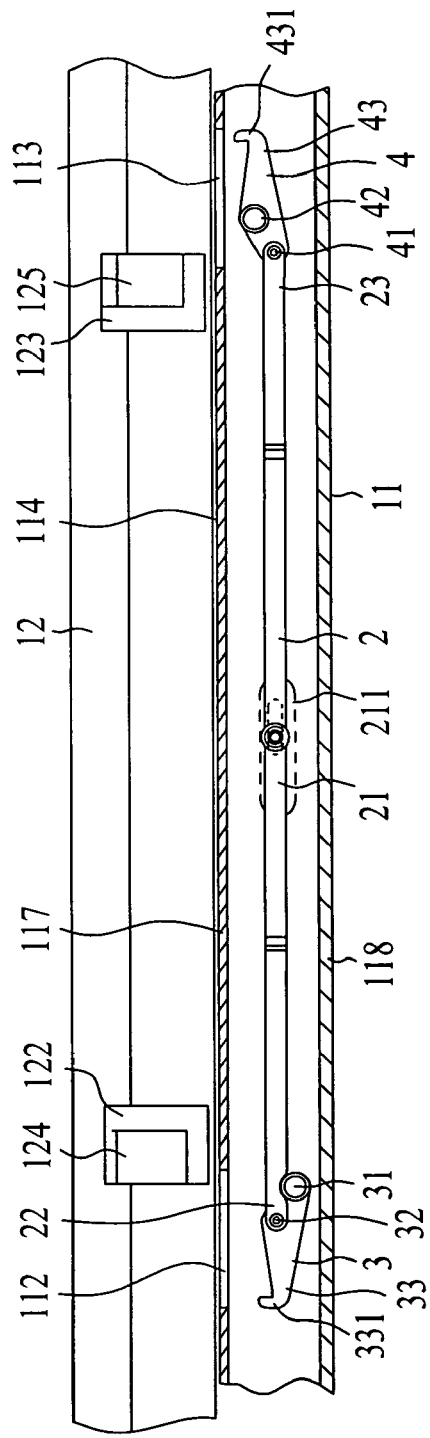
FIG. 4 is a sectional view of the preferred embodiment of the present invention before operation.

Referring to FIG. 4 and FIG. 2 and FIG. 3 again, the common lock of the present invention comprises an elongated operating frame bar 2, a left-side hook 3, and a right-side hook 4.

The elongated operating frame bar 2 is axially slidably supported on the sliding track members 116 inside the bottom cover shell 118 of the base member 11, having an operating portion 211 protruded from a middle part 21 thereof and inserted through the transverse slot 111 to the outside of the bottom cover shell 118 of the front panel 110 of the base member 11 for operation by the user. According to the present preferred embodiment, the operating portion 211 comprises a shank 212 perpendicularly extending from the middle part 21 of the elongated operating frame bar 2 and inserted through the transverse slot 111, and an anti-slip finger block 210 fixedly connected to the front (outer) end of the shank 212 and disposed outside the base member 11.

The left-side hook 3 has a lower part 31, a middle part 32, and an upper part 33. The lower part 31 is pivoted to the inside of the base member 11. The middle part 32 is pivoted to the left end 22 of the elongated operating frame bar 2. The upper part 33 terminates in an upwardly curved hooked portion 331.

The right-side hook 4 has a lower part 41, a middle part 42, and an upper part 43. The middle part 42 is pivoted to the inside of the base member 11. The lower part 41 is pivoted to the right end 23 of the elongated operating frame bar 2. The upper part 43 terminates in an upwardly curved hooked portion 431.

Figure 5:
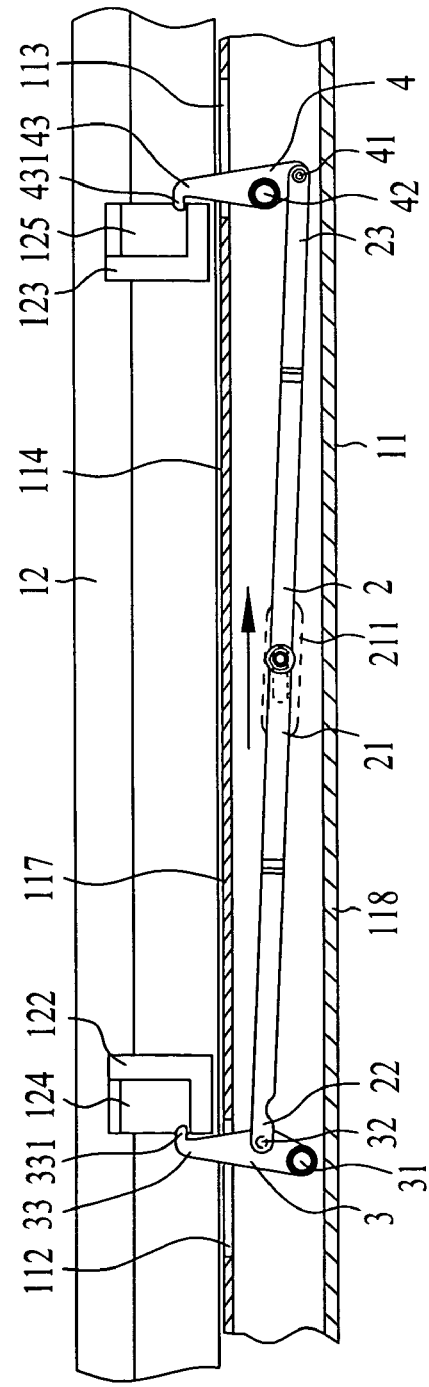
FIG. 5 is a sectional view showing the portable computer set in the form a notebook computer and locked.

Referring to FIG. 5 and FIG. 2~FIG. 4 again, when wishing to receive the dual-usage portable computer 1 in the form of a notebook computer, operate the anti-slip finger block 210 of the operating portion 211 of the elongated operating frame bar 2 to move the elongated operating frame bar 2 relative to the base member 11, causing the elongated operating frame bar 2 to move the left-side hook 3 and the right-side hook 4 by means of a lever action. At this time, the upwardly curved hooked portion 331 of the left-side hook 3 is forced through the left-side through hole 112 of base member 11 and engaged into the retaining hole 124 of the left-side retaining block 122 of the display 12, and the upwardly curved hooked portion 431 of the right-side hook 4 is forced through the right-side through hole 113 of base member 11 and engaged into the retaining hole 125 of the right-side retaining block 123 of the display 12, and therefore the display 12 is locked to the base member 11.

The front panel 110 of the base member 11 further has a hole 119. The operating portion 211 of the elongated operating frame bar 2 has a protrusion 213 for engaging into the hole 119 to hold the operating portion 211 in place.

Figure 6:
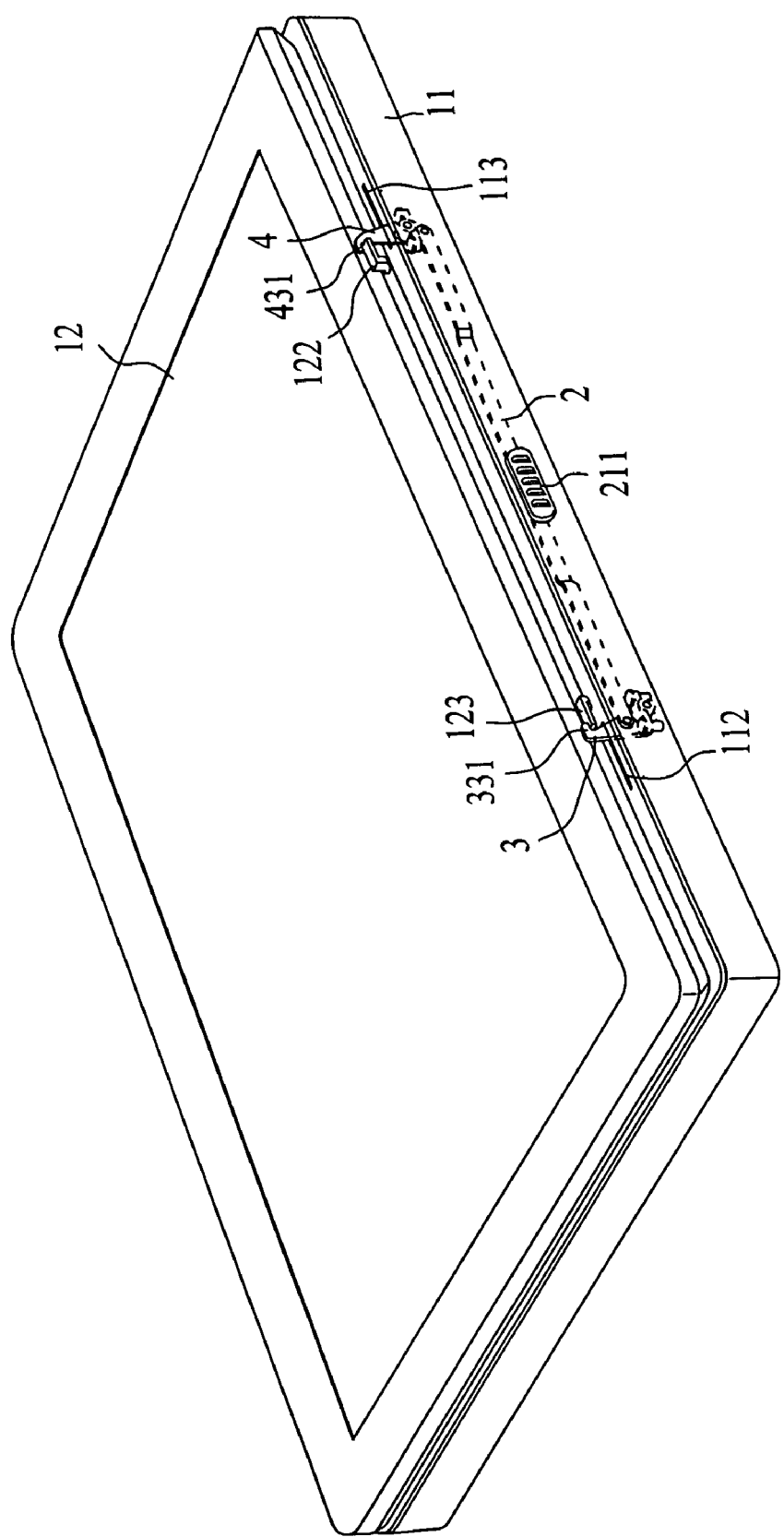
FIG. 6 is a sectional view showing the portable computer set in the form a tablet PC and locked.

Referring to FIG. 6 and FIG. 2~FIG. 4 again, when wishing to set the dual-usage portable computer 1 in the form of a tablet PC, rotate the display 12 through 180° and then close the reversed display 12 on the base member 11, and then operate the anti-slip finger block 210 of the operating portion 211 of the elongated operating frame bar 2 to move the elongated operating frame bar 2 relative to the base member 11, causing the elongated operating frame bar 2 to move the left-side hook 3 and the right-side hook 4 by means of a lever action. At this time, the upwardly curved hooked portion 331 of the left-side hook 3 is forced through the left-side through hole 112 of base member 11 and engaged into the right-side retaining block 123 of the display 12, and the upwardly curved hooked portion 431 of the right-side hook 4 is forced through the right-side through hole 113 of base member 11 and engaged into the left-side retaining block 122 the of the display 12, and therefore the display 12 is locked to the base member 11. After locking, the protrusion 213 of the operating portion 211 is engaged into the hole 119 to hold the operating portion 211 in place.

As indicated above, either the dual-usage portable computer 1 is set in the form of a notebook computer or tablet PC, the user can operate the elongated operating frame bar 2 to bias the left-side hook 3 and the right-side hook 4, forcing the upwardly curved hooked portions 331,431 of the hooks 3,4 out of the through holes 112,113 of the base member 11 into engagement with the retaining blocks 122, 123 of the display 12, thereby locking the display 12 to the base member 11.

Although the present invention has been explained in relation to its preferred embodiment, it is to be understood that many other possible modifications and variations can be made without departing from the spirit and scope of the invention as hereinafter claimed.

What is claimed is:

1. A common lock used in a dual-usage portable computer comprised of a base member and a display pivotally connected to said base member and rotated relative to said base member, said display comprising a front edge, a left-side retaining block protruded from said front edge at a left side, and a right-side retaining block protruded from said front edge at a right side, said base member comprising a front panel and a top surface, the top surface of said base member having a left-side through hole and a right-side through hole respectively corresponding to the left-side retaining block and right-side retaining block of said display, said front panel having a transverse slot disposed between said left-side through hole and said right-side through hole, the common lock comprising:

an elongated operating frame bar axially slidably mounted inside said base member, said elongated operating frame bar having a middle part, a left end, a right end, and an operating portion protruded from said middle part and inserted through the transverse slot of the front panel of said base member;

a left-side hook provided inside said base member, said left-side hook having a lower part pivoted to said base member, a middle part pivoted to the left end of said elongated operating frame bar, and an upper part curved upwards and terminating in a hooked portion for insertion through said left-side through hole of said base member to engage said left-side retaining block of said display; and a right-side hook provided inside said base member, said right-side hook having a middle part pivoted to said base member, a lower part pivoted to the right end of said elongated operating frame bar, and an upper part curved upwards and terminating in a hooked portion for insertion through said right-side through hole of said base member to engage said right-side retaining block of said display.

2. The common lock as claimed in claim 1, wherein said operating portion comprises a shank perpendicularly extending from the middle part of said elongated operating frame bar and inserted through the transverse slot of said base member, and an anti-slip finger block fixedly connected to a front end of said shank and disposed outside said base member.

3. The common lock as claimed in claim 1, wherein said front panel of said base member comprises sliding track means adapted to support said elongated operating frame bar.

4. The common lock as claimed in claim 1, wherein said left-side retaining block defines a retaining hole for receiving the hooked portion of said left-side hook.

5. The common lock as claimed in claim 1, wherein said right-side retaining block defines a retaining hole for receiving the hooked portion of said right-side hook.

6. The common lock as claimed in claim 1, wherein said base member is formed of a top cover shell and a bottom cover shell, and the left-side through hole and the right-side through hole of said base member are cut through said top cover shell.

7. The common lock as claimed in claim 1, wherein said top surface of said base member is mounted with a keyboard.

8. The common lock as claimed in claim 1, wherein said front panel of said base member has a hole; said operating portion of said elongated operating frame bar has an inner protruding portion for engaging into the hole of said front panel of said base member.

* * * * *